Nov. 10, 1959 F. NISTICO ET AL 2,911,823
TENSIOMETER
Filed Nov. 2, 1954 2 Sheets-Sheet 1
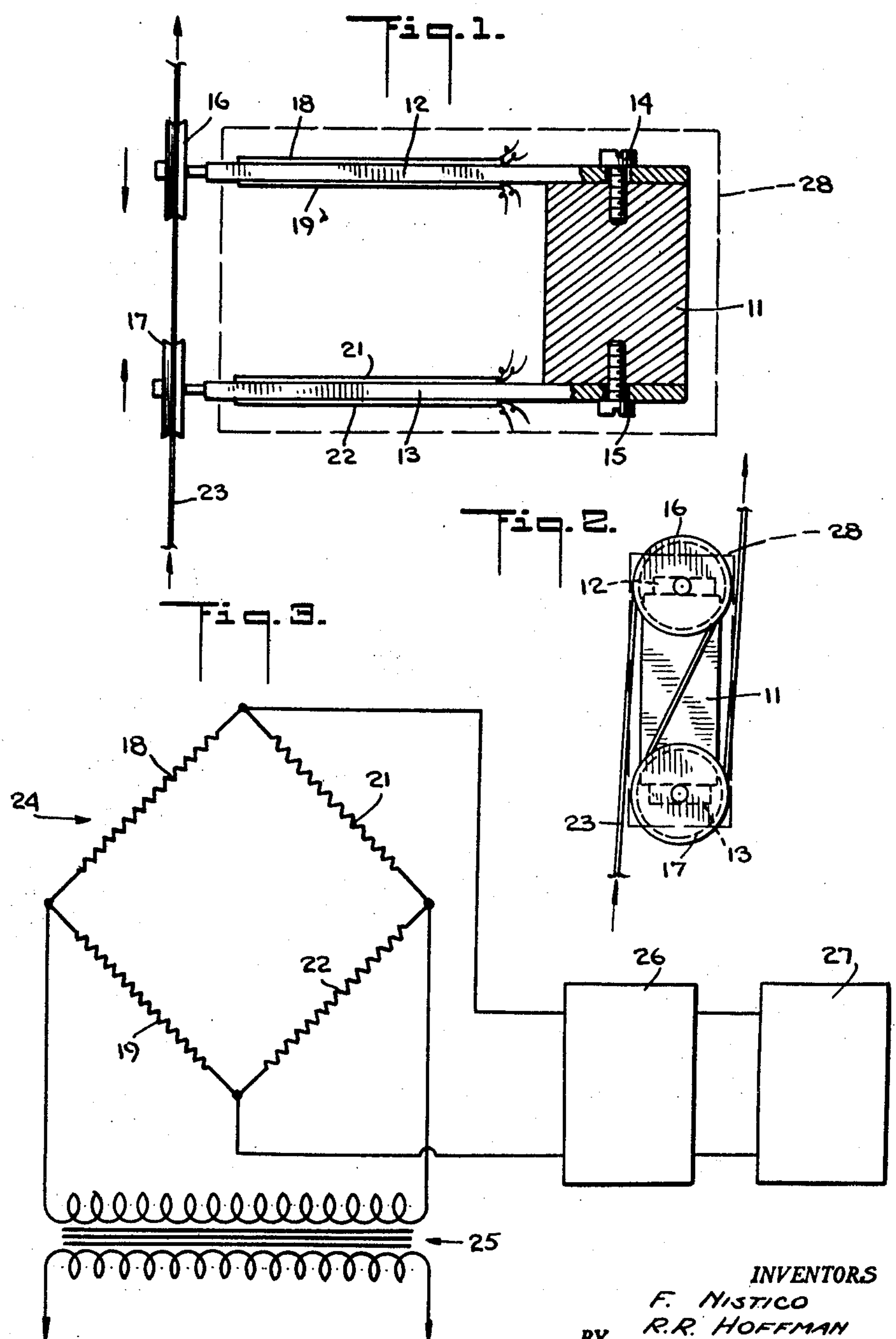
INVENTORS
F. NISTICO
R.R. HOFFMAN
BY
ATTORNEYS

INVENTORS
F. NISTICO
R.R. HOFFMAN
BY
ATTORNEYS

United States Patent Office 2,911,823

Patented Nov. 10, 1959

2,911,823

TENSIOMETER

Frank Nistico, Westfield, and Robert R. Hoffman, Newark, N.J., assignors to Celanese Corporation of America, New York, N.Y., a corporation of Delaware Application November 2, 1954, Serial No. 466,332

9 Claims. (Cl. 73—144)

This invention relates to a tensiometer and relates more particularly to a tensiometer of simple, rugged construction.

It is frequently desirable to measure the tension on a yarn of any sort while the said yarn is being treated in some manner, for example, while the yarn is being wound from one package to another, with or without twisting, or while the yarn is being woven or knitted into a fabric. The tensiometer employed for such measurement should indicate accurately the instantaneous tension on the yarn, even when the tension varies at an extremely high rate as is the case, for example, during the knitting of the yarn into a fabric. To achieve this end, the tensiometer must exhibit a high sensitivity. At the same time, however, the tensiometer should be relatively insensitive to external vibrations and the like, which are normally present in the vicinity of the equipment on which the yarn is being treated, to avoid the introduction of inaccuracies into the measured tension. It is readily apparent that the foregoing requirements are inconsistent at least to some extent since a tensiometer having a high sensitivity to variations in yarn tension will normally also exhibit a high sensitivity to external vibrations and the like.

It is an important object of this invention to provide a tensiometer which will fulfill the foregoing requirements and which will be especially simple in construction and efficient in operation.

A further object of this invention is to provide a tensiometer which will exhibit a high sensitivity to variations in yarn tension, but which will be relatively insensitive to external vibrations and the like.

Other objects of this invention will be apparent from the following detailed description and claims.

According to the present invention, there is provided a tensiometer in which the yarn tension moves a pair of members in opposite directions. Connected to said members are measuring means that are responsive to the movement of said members in opposite directions, but are not responsive to the simultaneous movement of said members in the same direction. With this arrangement, the yarn tension will produce a signal in the measuring means which is indicative of the magnitude of such tension. However, external vibrations and the like which will tend to move all parts of the tensiometer in the same direction, will not produce a signal in the measuring means. As a result, the sensitivity of the tensiometer can be adjusted to an extremely high level whereby it will measure changes in yarn tension accurately, even when such tensions occur at an extremely rapid rate. At the same time, the tensiometer will be insensitive to external vibrations and the like so that such vibrations will not interfere with the accurate measurement of the yarn tension.

In one embodiment of this invention, the tensiometer comprises a pair of identical beams, which are preferably mounted as cantilever beams, that are positioned parallel to one another. Yarn guide means, which may take the form of freely rotatable pulleys secured to the ends of the beams, are provided to guide a yarn past the tensiometer in such a manner that the tension in the yarn will bend the cantilever beams in opposite directions, for example, towards one another. Strain gages are fastened to both surfaces of each of the beams so that when the yarn tension bends the beams, the two strain gages that are secured to the surfaces of the beams that face one another will be placed in compression and the other two strain gages will be placed in tension. The strain gages are electrically interconnected to form a Wheatstone bridge in such a manner that the movement of the cantilever beams under the tension of the yarn will throw the Wheatstone bridge out of balance. External vibrations and the like, which will move both cantilever beams simultaneously in the same direction will be balanced out in the Wheatstone bridge. The degree of unbalance of the Wheatstone bridge will be dependent on and will be a measure of the yarn tension and will not be affected by external vibrations and the like. The Wheatstone bridge may be connected to an amplifier and recorder whereby a permanent record of the yarn tension may be readily obtained.

A preferred embodiment of this invention is shown in the accompanying drawings wherein Fig. 1 is a side elevation of the tensiometer, Fig. 2 is an end elevation of the tensiometer shown in Fig. 1, Fig. 3 is a diagram showing schematically the electrical circuit employed in the tensiometer.

Like reference numerals indicate like parts throughout the several views of the drawings.

Figure 4:
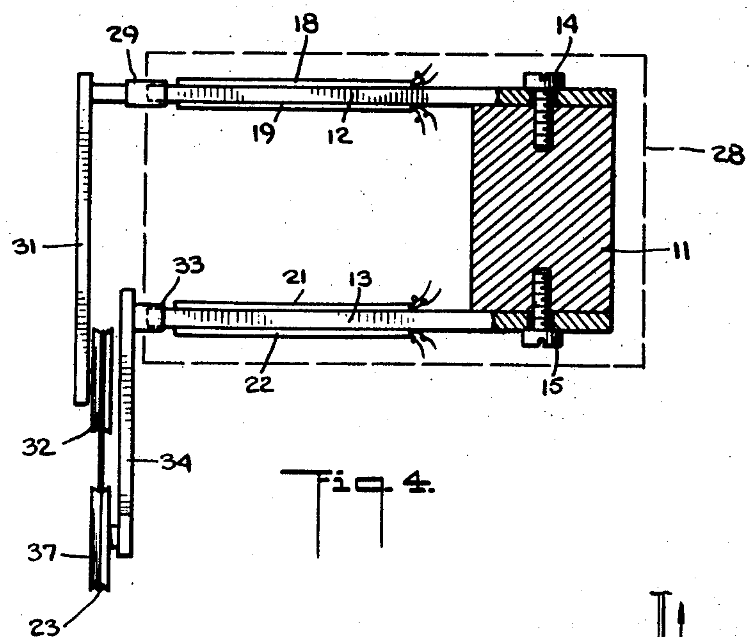
Fig. 4 is a side elevation of a modified form of tensiometer.

Referring now to the drawings, and more particularly to Figs. 1 to 3 thereof, the reference numeral 11 designates a block to which spaced parallel, identical cantilever beams 12 and 13 are secured by means of screws 14 and 15, respectively. Fastened to the free ends of the beams 12 and 13, respectively, are freely rotatable grooved pulleys 16 and 17. Strain gages 18 and 19 are fastened to the upper and lower surfaces of the cantilever beam 12, and strain gages 21 and 22 are fastened to the upper and lower surfaces of the cantilever beam 13. A yarn 23, whose tension it is desired to measure, is passed over the upper peripheral surface of the pulley 16, crossed over between the pulleys 16 and 17, and passed under the lower peripheral surface of the pulley 17. With this arrangement, the tension in the yarn 23 will bend the cantilever beams 12 and 13 towards one another. To thread up the yarn 23, the tensiometer is positioned so that the yarn is between the pulleys 16 and 17 and the tensiometer is then rotated through an angle of 180° to wrap the yarn around the said pulleys.

The strain gages 18, 19, 21 and 22 are connected to form a Wheatstone bridge, indicated generally by reference numeral 24, to which an alternating voltage is applied from any suitable source (not shown) through a transformer 25. The output from the Wheatstone bridge is connected to an amplifier 26 which feeds a recorder 27 to make a permanent record of the yarn tension. In a preferred embodiment of the invention, the unstressed resistances of the strain gages 18, 19, 21 and 22 are identical so that there will be no signal from the Wheatstone bridge when no tension is applied to the yarn 23. The entire unit comprising the block 11 and the cantilever beams is enclosed in a casting 28.

During use, when a yarn 23 under tension is being run over pulleys 16 and 17, the tension in the said yarn will bend the cantilever beams 12 and 13 towards each other. This bending will place the strain gages 18 and 22 in tension and will place the strain gages 19 and 21 in compression, thereby altering the resistance of said strain gages, throwing the Wheatstone bridge 24 out of balance and producing a signal which will pass through the amplifier 26 and appear on the recorder 27. The degree of bending of the cantilever beams 12 and 13 will vary with variations in the tension on the yarn 23 so that the degree of unbalance of the Wheatstone bridge 24 and the signal in the recorder 27 will depend on and be a measure of such tension. By proportioning the parts correctly and employing an amplifier 26 and recorder 27 of high sensitivity it is possible to measure small variations in tension even when such variations in tension occur at a rapid rate. It is desirable, when employing the apparatus of this invention to measure variations in tension that occur at a rapid rate, to design the cantilever beams 12 and 13 in such a manner that the natural frequency of vibration of such cantilever beams is well above the frequency at which the tension varies to avoid the development of resonant vibrations in said beams.

With the arrangement shown, external vibrations and the like will not interfere with the measurement of the yarn tension. For example, if the external vibration bends the cantilever beam 12 downwardly it will also bend the cantilever beam 13 downwardly by a like amount. This will put the strain gages 18 and 21 in tension and simultaneously put the strain gages 19 and 22 in compression. The changes in the resistances of the strain gages 18 and 21, which are in tension, will be identical and will be balanced out in the Wheatstone bridge 24 so that they will not effect the output signal from said Wheatstone bridge. Similarly the changes in the resistances of the strain gages 19 and 22, which are in compression, will be identical and will be balanced out. As a result, the external vibration will not produce a reading on the recorder 27 and will not interfere with the measurement of the tension in the yarn 23. A like result will be produced when the external vibration bends the cantilever beams 12 and 13 upwardly.

Figure 5:
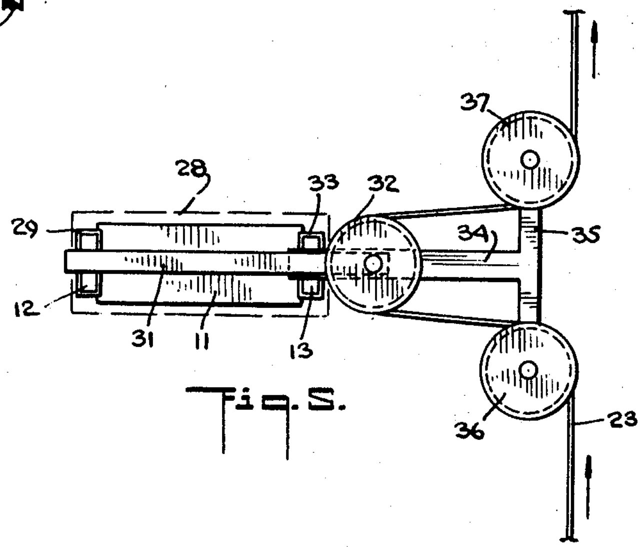
Fig. 5 is an end elevation of the tensiometer shown in Fig. 4.

The modification shown in Figs. 4 and 5 of the drawings is designed for use when it is desired to measure the tension of a yarn to which it is difficult to secure access, for example, a yarn in a warp of yarns going to the knitting station of a knitting machine. Where the parts in this modification are identical with the parts in Figs. 1 to 3 of the drawings like reference numerals are applied thereto. In this arrangement, there is secured to the end of the cantilever beams 12, by means of a clip 29, an arm 31 that extends at right angles to the cantilever beam 12 and lies parallel to a plane passing through the axes of the cantilever beams 12 and 13. At its free end, the arm 31 carries a freely rotatable grooved pulley 32. Secured to the cantilever beam 13, by means of a clip 33, is an arm 34 which extends at right angles to the cantilever beam 13 and parallel to the arm 32. At its free end, the arm 34 has secured thereto a cross piece 35 that carries at its ends freely rotatable grooved pulleys 36 and 37 disposed in the same plane as the pulley 32. The yarn 23 whose tension it is desired to measure is trained over the pulley 36, around the pulley 32 and under the pulley 37. The tension on the yarn 23 will apply a force to the pulley 32, and the arm 31 to which said pulley is secured, tending to move said pulley and said arm to the right (Fig. 5) and bending the cantilever beam 12 toward the cantilever beam 13. Simultaneously, the tension on the yarn 23 will apply a force to the pulleys 36 and 37, and the arm 34 to which said pulleys are operatively secured, tending to move said pulleys and said arm to the left and bending the cantilever beam 13 toward the cantilever beam 12. The bending of the cantilever beams 12 and 13 towards one another will produce a signal in the Wheatstone bridge 24 which will pass through the amplifier 26 to the recorder 27. Any external vibrations, as explained above, will be balanced out and will not affect the accuracy of the tension measurements.

It is to be understood that the foregoing detailed description is merely given by way of illustration and that many variations may be made therein without departing from the spirit of our invention.

Having described our invention, what we desire to secure by Letters Patent is:

1. A tensiometer for measuring the tension on a yarn comprising a pair of spaced, parallel, cantilever beams, means supporting said pair of beams for movement, means for guiding the yarn into operative contact with the free ends of the beams in such a manner that the yarn tension will bend said beams in opposite directions, and means responsive to the movement of said beams in opposite directions for indicating the yarn tension, said means being non-responsive to the movement of said beams in the same direction.

2. A tensiometer for measuring the tension on a yarn comprising a pair of spaced, parallel, identical cantilever beams, means supporting said pair of beams for movement, means for guiding the yarn into operative contact with the free ends of the beams in such a manner that the yarn tension will bend said beams in opposite directions, and means connected to said cantilever means responsive to the movement of said beams in opposite directions for indicating the yarn tension, said means being non-responsive to the movement of said cantilever beams in the same direction.

3. A tensiometer for measuring the tension on a yarn comprising a pair of spaced, parallel, identical cantilever beams, means supporting said pair of beams for movement, freely rotatable pulleys fastened to the free ends of the beams around which the yarn is trained in such a manner that the yarn tension will bend said beams in opposite directions, and means responsive to the movement of said beams in opposite directions for indicating the yarn tension, said means being non-responsive to the movement of said beams in the same direction.

4. A tensiometer for measuring the tension on a yarn comprising a pair of spaced, parallel, identical cantilever beams, means supporting said pair of beams for movement, strain gages secured to both surfaces of said beams, and freely rotatable pulleys fastened to the free ends of the beams around which the yarn is trained in such a manner that the yarn tension will bend said beams in opposite directions whereby the yarn tension will stress the strain gages secured to the surfaces of the beams facing each other in one manner and will stress the strain gages secured to the other surfaces of the beams in the opposite manner.

5. A tensiometer for measuring the tension on a yarn comprising a pair of cantilever beams, means supporting said pair of beams for movement, strain gages secured to both surfaces of said beams, and means for guiding the yarn into operative contact with the free ends of the beams in such a manner that the yarn tension will bend said beams in opposite directions whereby the yarn tension will stress the strain gages secured to the surfaces of the beams facing each other in one manner and will stress the strain gages secured to the other surfaces of the beams in the opposite manner the structure and arrangement of said beams being such that external vibration will result in movement of said beams in the same direction.

6. A tensiometer for measuring the tension on a yarn comprising a pair of cantilever beams, means supporting said pair of beams for movement, strain gages secured to both surfaces of said beams, means for guiding the yarn into operative contact with the free ends of the beams in such a manner that the yarn tension will bend said beams in opposite directions whereby the yarn tension will stress the strain gages secured to the surfaces of the beams facing each other in one manner and will stress the strain gages secured to the other surfaces of the beams in the opposite manner, and means connected to said strain gages responsive to the stresses in said strain gages produced by the movement of said beams in opposite directions for indicating the yarn tension the structure and arrangement of said beams being such that external vibration will result in movement of said beams in the same direction.

7. A tensiometer for measuring the tension on a yarn comprising a pair of spaced, parallel, identical cantilever beams, means supporting said pair of beams for movement, strain gages secured to both surfaces of said beams, freely rotatable pulleys fastened to the free ends of the beams around which the yarn is trained in such a manner that the yarn tension will bend said beams in opposite directions whereby the yarn tension will stress the strain gages secured to the surfaces of the beams facing each other in one manner and will stress the strain gages secured to the other surfaces of the beams in the opposite manner, and means connected to said strain gages responsive to the stresses in said strain gages produced by the movement of said beams in opposite directions for indicating the yarn tension, said means being non-responsive to the movement of said cantilever beams in the same direction.

8. A tensiometer for measuring the tension on a yarn comprising a pair of cantilever beams, means supporting said pair of beams for movement, strain gages secured to both surfaces of said beams, means for guiding the yarn into operative contact with the free ends of the beams in such a manner that the yarn tension will bend said beams in opposite directions whereby the yarn tension will stress the strain gages secured to the surfaces of the beams facing each other in one manner and will stress the strain gages secured to the other surfaces of the beams in the opposite manner, and means connecting said strain gages to form a Wheatstone bridge which will be thrown out of balance by the resistance changes in said strain gages resulting from the stresses in said strain gages produced by the movement of said beams in opposite directions the structure and arrangement of said beams being such that external vibration will result in movement of said beams in the same direction.

9. A tensiometer for measuring the tension on a yarn comprising a pair of spaced, parallel, identical cantilever beams, means supporting said pair of beams for movement, strain gages secured to both surfaces of said beams, freely rotatable pulleys fastened to the free ends of the beams around which the yarn is trained in such a manner that the yarn tension will bend said beams in opposite directions whereby the yarn tension will stress the strain gages secured to the surfaces of the beams facing each other in one manner and will stress the strain gages secured to the other surfaces of the beams in the opposite manner, and means connecting said strain gages to form a Wheatstone bridge which will be thrown out of balance by the changes in resistance in said strain gages resulting from the stresses in said strain gages produced by the movement of said beams in opposite directions, but which will not be thrown out of balance by the stresses in said strain gages produced by the movement of said beams in the same direction.

References Cited in the file of this patent

UNITED STATES PATENTS 2,316,203 Simmons ---------------- Apr. 13, 1943
2,362,626 Giffen ------------------ Nov. 14, 1944
2,661,623 Brink -------------------- Dec. 8, 1953

FOREIGN PATENTS 832,339 Germany ---------------- Feb. 25, 1952